(12) United States Patent
Neumüller et al.

(10) Patent No.: US 7,051,833 B2
(45) Date of Patent: May 30, 2006

(54) GANTRY AXLE

(75) Inventors: Rudolf Neumüller, Büchlberg (DE); Stefan Häubler, Passau-Patriching (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 171 days.

(21) Appl. No.: 10/646,007

(22) Filed: Aug. 22, 2003

(65) Prior Publication Data

US 2005/0039970 A1    Feb. 24, 2005

(51) Int. Cl.
*B60K 17/00* (2006.01)
(52) U.S. Cl. .................................. 180/363; 180/371
(58) Field of Classification Search ................ 180/348, 180/349, 352–356, 363, 371, 372, 374–376, 180/383–385; 280/93.512, 93.513, 124.129
See application file for complete search history.

(56) References Cited

U.S. PATENT DOCUMENTS

| | | | | |
|---|---|---|---|---|
| 2,531,268 A * | 11/1950 | Herrington | .................. | 180/254 |
| 2,846,038 A * | 8/1958 | Brownyer | ................ | 192/48.91 |
| 2,922,482 A * | 1/1960 | Fisher | ........................ | 180/236 |
| 3,150,531 A * | 9/1964 | Singer | ........................ | 74/390 |
| 3,862,667 A * | 1/1975 | Wolansky | .................... | 180/233 |
| 6,035,956 A * | 3/2000 | Maurer et al. | ............. | 180/383 |
| 6,095,005 A * | 8/2000 | Tanzer et al. | ................. | 74/390 |
| 6,722,459 B1 * | 4/2004 | Wendl et al. | ............... | 180/65.5 |
| 6,755,093 B1 * | 6/2004 | Bennett et al. | ............... | 74/438 |
| 6,871,723 B1 * | 3/2005 | Varela | ........................ | 180/348 |
| 6,886,655 B1 * | 5/2005 | Varela et al. | ................ | 180/343 |

FOREIGN PATENT DOCUMENTS

| | | |
|---|---|---|
| DE | 21 16 441 | 2/1977 |
| DE | 196 04 730 A1 | 8/1997 |
| DE | 198 52 663 A1 | 5/2000 |
| EP | 456096 A1 * | 11/1991 |
| EP | 0 599 293 B1 | 8/1997 |

* cited by examiner

*Primary Examiner*—Paul N. Dickson
*Assistant Examiner*—Laura B. Rosenberg
(74) *Attorney, Agent, or Firm*—Davis & Bujold, P.L.L.C.

(57) ABSTRACT

In a gantry axle for low-platform vehicles, the gantry transmission consists of one input spur gear (2) operatively connected with a first intermediate spur gear (3) non-rotatably connected with a second intermediate spur gear (4) operatively connected with an output spur gear (5). The vertical distance of the axis of rotation (10) of the input spur gear to the ground (11) is smaller than the vertical distance of the intermediate spur gears (9, 4) to the ground (11).

19 Claims, 2 Drawing Sheets

GANTRY AXLE

FIELD OF THE INVENTION

The invention concerns a gantry axle, especially for low-platform autobuses.

BACKGROUND OF THE INVENTION

According to their species gantry axles are especially used in low-platform autobuses where it is important to dispose the vehicle bottom low enough so that the passengers can comfortably enter from the sidewalk into the omnibus. It is to be taken into consideration here that the omnibus has sufficiently wide gangway available and, at the same time, does not fall short of ground clearance for running over obstacles.

DE 196 04 730 A1 discloses a gantry axle for low-platform autobuses in which the gantry transmission is driven, via an axle shaft, by a differential gear unit, two spur gears being situated between the input pinion and the output spur gear whose axes of rotation are disposed at the same height as the axis of rotation of the input pinion in order to obtain a power split on the input pinion to minimize the diameter and width of the input pinion. The gantry spacing between the axis of rotation of the input pinion and the axis of rotation of the output spur gear cannot be further enlarged since this would need a further enlargement of the diameter of the intermediate wheels which does not make a tying of the spring carrier possible in the usual manner. The ground clearance of a low-platform axle is determined by the opposition of the axis of rotation and the diameter of the crown wheel of the differential gear unit.

The published DE 21 16 441 discloses, the same as in DE 196 04 730 A1, an axle transmission for motor vehicles with a gantry axle in which the input pinion, is disposed flush with the intermediate wheels and stays in a split power operative connection with said intermediate wheels, the intermediate wheels consisting of one first spur gear and one second spur gear which are non-rotatably interconnected, the first spur gear being connected with the input pinion and the second spur gear with an output spur gear, the output spur gear driving the vehicle wheel. The axes of rotation of the intermediate shafts and the axis of rotation of the axle shaft must be on a common plane, the pinion shaft being radially movably supported on all sides in order to improve further the contact pattern of the tooth flanks.

The problem on which this invention is based is to provide a gantry axle, in particular for low-platform vehicles such as city autobuses, in which a sufficient ground clearance exists and the gantry spacing, compared to the prior art, is enlarged without detracting from the possibility of connecting of the gantry axle to the vehicle chassis.

SUMMARY OF THE INVENTION

According to the invention, the gantry axle has a driven differential gear unit the output of which is connected, via axle shafts, with the input of the gantry transmission. The gantry transmissions are each in the proximity of the vehicle wheels and are connected, on one side, with an axle tube which connects the two gantry transmissions and, on the other, with a hub carrier containing the wheel bearings. One brake, such as a multi-disc brake, is preferably situated between the gantry transmission and the wheel rim. The differential gear unit is preferably located adjacent to the gantry transmission. The input spur gear which is connected with the axle shaft is in operative connection with a first intermediate spur gear non-rotatably connected with a second intermediate spur gear, the second intermediate spur gear is in operative connection with an output spur gear which forms the output of the gantry transmission being thus connected with the vehicle wheel. The vehicle wheel and the output spur gear have the same axis of rotation. Compared to the prior art, the ratio of the gantry transmission is enlarged whereby the ratio of the differential gear unit or of the bevel gear transmission can be reduced whereby the ground clearance enlarges due to a reduced differential gear unit or the ground clearance can be kept by using a reduced differential gear unit and a reduced crown wheel with enlarged gantry distance. An enlargement of the ratio of the gantry transmission is only possible by the arrangement of the input spur gear, the vertical spacing to the ground on which the vehicle wheel stands is smaller than the vertical spacing of the axis of rotation of the intermediate spur gear. Said gantry drive is designed with a horizontal axial offset, in the direction of travel, so that the drive wheel and the intermediate spur gears can be chosen with a diameter as large as possible with a preset axial offset and a preset reduction ratio and thus possess enough strength to transmit the input torque. The axis of rotation of the input spur gear is situated spaced from the axis of rotation of the intermediate spur gear. The axis of rotation of the intermediate spur gear is preferably situated spaced from the axis of rotation of the output spur gear. It is thus possible to enlarge the gantry distance between the axis of rotation of the input spur gear and the axis of rotation of the output spur gear and the ratio in the gantry transmission whereby, on one hand, the vehicle bottom lowers by an enlargement of the gantry distance and, on the other, by using a small differential gear unit and small crown wheel the ground clearance can be retained.

Likewise, in this arrangement, the possibility exists of situating spring carriers directly on the gantry housing, stationarily to connect them therewith or make them integrally therewith, by which the gantry axle is connected with the chassis. The toothing of the gantry transmission is preferably designed as a helical toothing, the toothing of the first and of the second intermediate spur gears being designed so that the axial forces of the first and of the second intermediate spur gears become almost neutralized. By using an input spur gear operatively connected exclusively with one other spur gear, whereby no power split occurs anymore, it is possible easily to mount the input spur gear without statically over-determine the gantry transmission. It is possible also to limit the diameter of the output spur gear so that a brake, preferably a multi-disc brake, can be situated between the gantry transmission and the rim of the wheel. By the fact that the input wheel is horizontally offset in the travel direction, the whole axle bridge of the differential gear unit is also horizontally offset in the travel direction. Thereby, a longer universal shaft can be used whereby the deflection angle of the universal shaft becomes smaller.

According to the invention the diameter of the crown wheel can be minimized by the ratio of the gantry transmission being enlarged. This is only possible by using the inventive gantry transmission. In the ratio of the gantry transmission according to DE 196 04 730 A1, the ratio is determined by the diameters of the output spur gear and of the input spur gear. The output spur gear cannot be enlarged in this gantry axle since it would collide with the brake, the input spur gear cannot be minimized for reasons of stability. Thus, an enlargement of the ratio of the gantry transmission is not possible by using DE 196 04 730 A1 since the crown wheel cannot be minimized whereby the ground clearance would become inadmissibly minimized by an enlargement of the gantry offset.

BRIEF DESCRIPTION OF THE DRAWINGS

The invention will now be described, by way of example, with reference to the accompanying drawings in which.

DETAILED DESCRIPTION OF THE INVENTION

Figure 1:
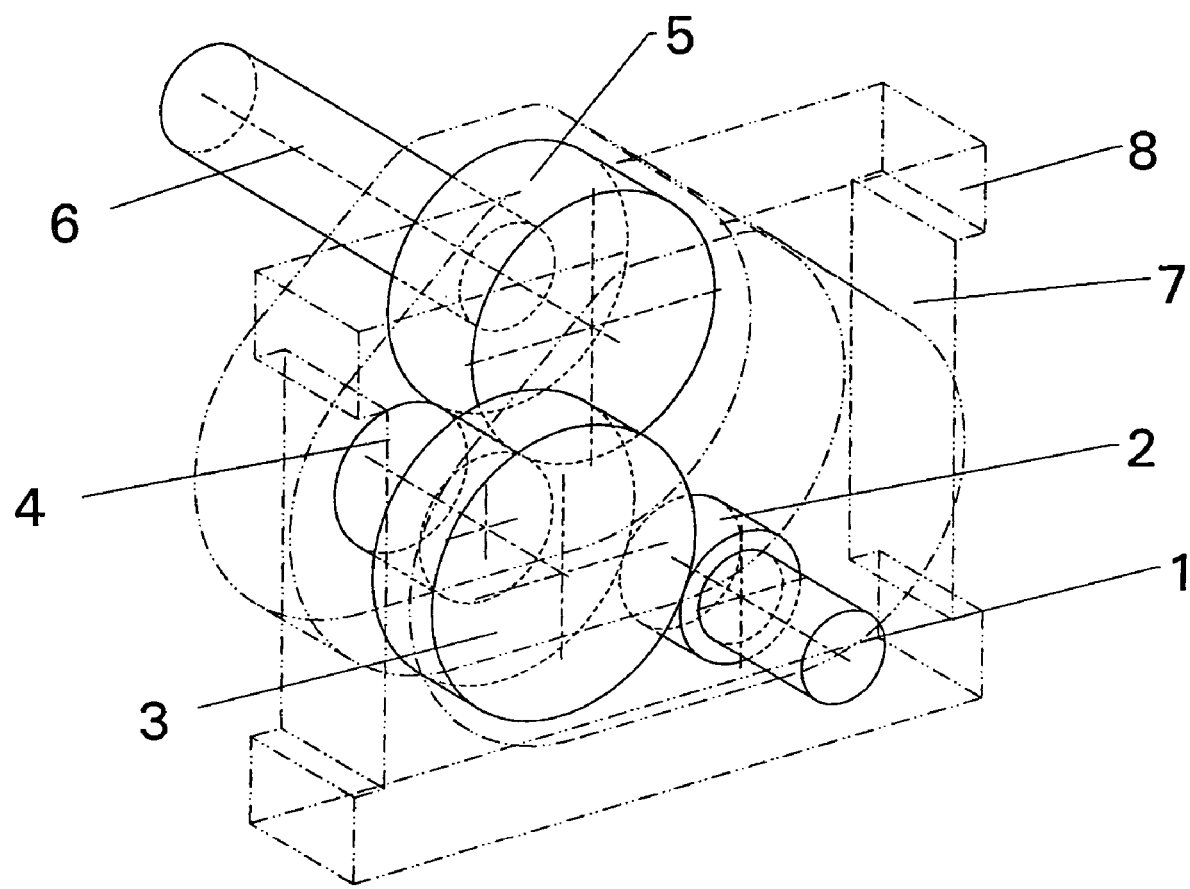
FIG. 1 is an isometric representation of the gantry transmission.
Figure 2:
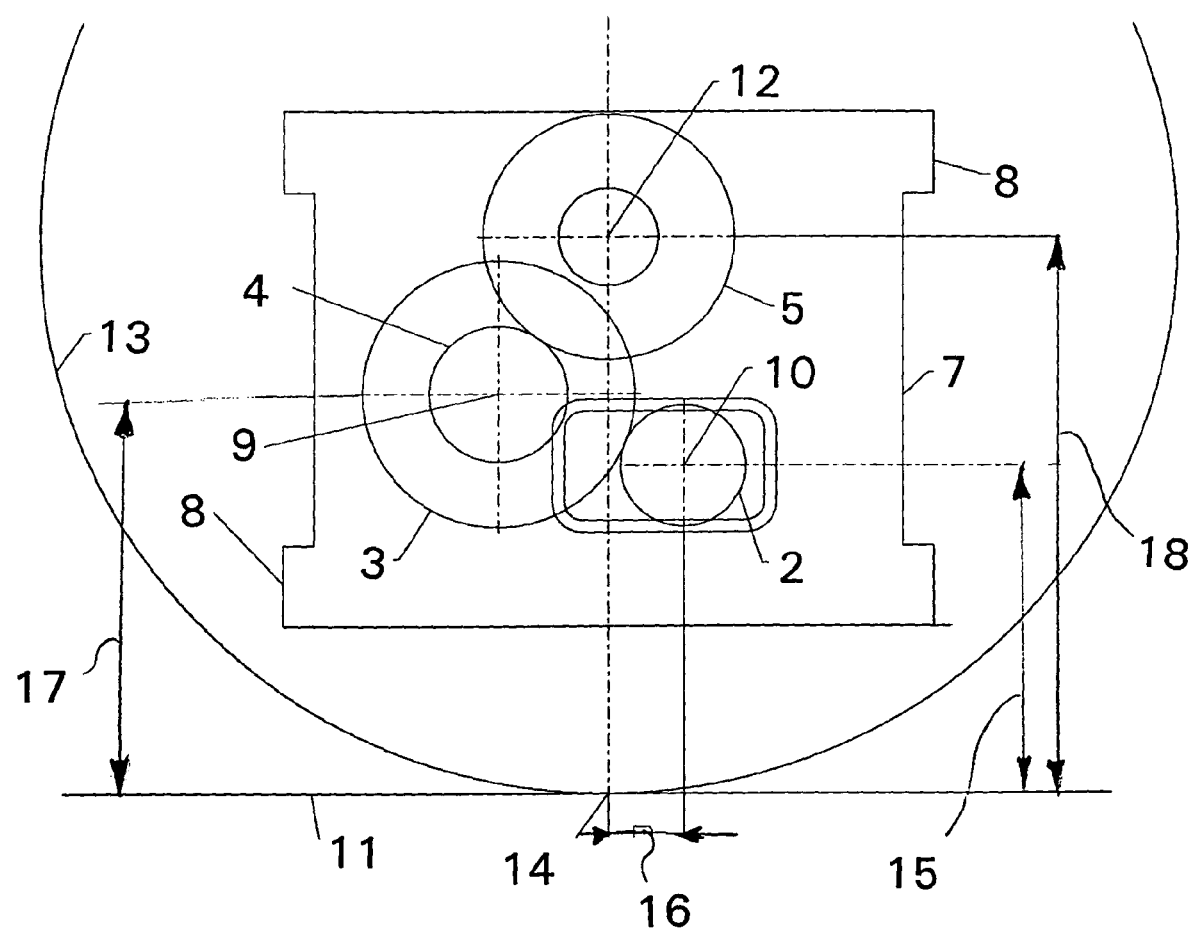
FIG. 2 shows a diagrammatic section through the gantry transmission.

FIG. 1:

The fundamental configuration of a gantry axle, for low-platform vehicles, is to be understood from DE 196 04 730 A1 the features of which are to be entirely comprised except for the gantry transmission.

One differential gear unit (not shown) drives an axle shaft 1 which is non-rotatably connected with an input spur gear 2. The input spur gear 2 is operatively connected with a first intermediate spur gear 3 which is non-rotatably connected with a second intermediate spur gear 4 or is made integrally therewith. The second intermediate spur gear 4 is operatively connected with the output spur gear 5 which drives a vehicle wheel (not shown), via an output shaft 6. A gantry transmission housing 7 surrounds the gantry transmission and has tying points 8 to which spring carriers (not shown), which connect the vehicle axle with the vehicle chassis can be connected. The axle shaft 1 is situated in the upper area of an axle tube (not shown). The second intermediate spur gear 4 and the output spur gear 5 are adjacent to a mounting pad (not shown) of the rim and the input spur gear 2 and the intermediate spur gear 3 are situated adjacent to the axle bridge (not shown). It is also possible to situate the input spur gear 2 and the intermediate spur gear 3 adjacent to the mounting pad (not shown) of the rim and the output spur gear 5 and the second intermediate spur gear 4 adjacent to the axle bridge in direction of the axle shaft 1 whereby a recess can be made in the proximity of the brake. By using this recess, ground clearance for a brake saddle or brake cylinder of a multi-disc brake can be designed sufficiently large.

FIG. 2:

The gantry transmission, in which the input spur gear 2 is operatively connected with a first intermediate spur gear 3, is situated within a gantry transmission housing 7. The intermediate spur gear 3 is non-rotatably connected with a second intermediate spur gear 4 which is operatively connected with an output spur gear 5. The first intermediate spur gear 3 and the second intermediate spur gear 4 have the same axis of rotation 9. The axis of rotation 10 of the input spur gear has a smaller vertical distance 15 to the ground 11 upon which the tire outer contour 13 rests, via a wheel tread point 14, than the vertical distance 17 of the axis of rotation 9 to the ground 11 or the vertical distance 18 of the axis of rotation 12 of the output spur gear 5 to the ground 11. The axis of rotation 10 is situated in a vertical and a horizontal spaced direction from the axis of rotation 9, the axis of rotation 9 is situated in a vertical and horizontal spaced direction from the axis of rotation 12. It is also possible to situate the axis of rotation 10 on the same vertical line as the axis of rotation 12 so that no horizontal spacing 16 results. It is thereby possible to design the right and the left gantry housing without a horizontal offset whereby the gantry housings can be designed equal. The ratio between the input spur gear 2 and the first intermediate spur gear 3 is preferably formed in the range of 2.2. The ratio between the second intermediate spur gear 4 and the output spur gear 5 is preferably formed in the range of 1.8. Thus, a gantry transmission can be designed in which the gantry spacing between the axis of rotation 12 and the axis of rotation 10, in the horizontal direction, is the range of 30 mm and, in the vertical direction, is in the range of 189 mm. It is thus possible to configure the differential gear unit (not shown) and the crown wheel (not shown) with smaller diameter since it experiences a small maximum torque and thus, when the ground clearance remains equal, the gantry distance enlarges. It is also possible to situate a brake, especially a multi-disc brake, between the wheel rim and the gantry transmission and to make mounting of the spring carrier via the tying points 8.

In presently preferred embodiments of the above described gantry transmission, the toothing of the spur gears of the gantry transmission is preferably designed as a helical toothing, the toothing of the first and of the second intermediate spur gears being designed so that the axial forces of the first and of the second intermediate spur gears become almost neutralized. In particular, the helical toothing of the spur gears is cut at a sloping angle whereby the helical cut teeth of the first and of the second intermediate spur gears (3, 4) are designed so that the axial forces of the first and of the second intermediate spur gears (3, 4) are substantially neutralized.

REFERENCE NUMERALS 1 axle shaft
2 input spur gear
3 first intermediate spur gear
4 second intermediate spur gear
5 output spur gear
6 output shaft
7 gantry transmission housing
8 tying points
9 axis of rotation
10 axis of rotation
11 ground
12 axis of rotation
13 tire outer contour
14 wheel stand up point
15 vertical distance
16 horizontal spacing
17 vertical distance
18 vertical distance

The invention claimed is:

1. A gantry axle comprising a driven differential gear unit which is connected, via an axle shaft (1) and via a respective gantry transmission, with each vehicle wheel, and each vehicle wheel being rotatable around an axis of rotation (12) of the vehicle wheel and resting up on ground (11), each gantry transmission having an input spur gear (2) driven by the axle shaft (1), the input spur gear (2) being operatively connected with a first intermediate spur gear (3) and the first intermediate spur gear (3) being non-rotatably connected with a second intermediate spur gear (4), both the first and the second intermediate spur gears (3, 4) rotating around an axis of rotation (9) of the intermediate spur gears (3, 4), and the second intermediate spur gear (4) being operatively connected with an output spur gear (5) which is connected with the vehicle wheel and rotates around the axis of rotation (12) of the vehicle wheel;

wherein a vertical spacing (15) of an axis of rotation (10) of the input spur gear (2) to the ground (11) is less than a vertical spacing (17) of the axis of rotation (9) of the intermediate spur gears (3, 4) to the ground (11) and is less than a vertical spacing (18) of the axis of rotation (12) of the output gear (5) to the ground (11);

the input, the first and second intermediate and the output spur gears (2, 3, 4, 5) of the gantry transmission have helical cut teeth that are inclined with respect to axes of rotation (10, 9, 12) of the input, the first and second intermediate and the output spur gears (2, 3, 4, 5); and a sloping angle of the helical cut teeth of the first and of the second intermediate spur gears (3, 4) are designed so that the axial forces of the first and of the second intermediate spur gears (3, 4) are substantially neutralized.

2. The gantry axle according to claim 1, wherein the axis of rotation (10) of the input spur gear (2) is spaced from the axis of rotation (9) of the first and second intermediate spur gears (3, 4) and the axis of rotation (9) of the intermediate spur gears (3, 4) is spaced from the axis of rotation (12) of the output spur gear (5).

3. The gantry axle according to claim 1, wherein spring carriers, which connect the gantry axle with a vehicle chassis, are connected with the gantry transmission.

4. The gantry axle according to claim 1, wherein the axle shaft (1) is situated on an upper inner limit of an axle bridge.

5. The gantry axle according to claim 1, wherein the input spur gear (2) is mounted in a housing of the gantry transmission and the second intermediate sour gear (4) and the output sour gear (5) are adjacent to a mounting pad of a rim of a transmission housing.

6. The gantry axle according to claim 1, wherein a ratio between the input spur gear (2) and the first intermediate spur gear is in a range of about 2.2.

7. The gantry axle according to claim 1, wherein a ratio between the second intermediate spur gear (4) and the output spur gear (5) is about 1.8.

8. The gantry axle according to claim 1, wherein a horizontal spacing between the axis of rotation (12) of the output spur gear (5) and the axis of rotation (10) of the input spur gear (2) is about 30 mm and a vertical spacing between the axis of rotation (12) of the output spur gear (5) and the axis of rotation (10) of the input spur gear (2) is about 189 mm.

9. The gantry axle according to claim 1, wherein an axle bridge is situated offset, in a travel direction of a vehicle equipped with the gantry axle, relative to the axis of rotation (12) of the vehicle wheel.

10. The gantry axle according to claim 1, wherein the second intermediate spur gear (4) and the output spur gear (5) are adjacent to a mounting pad of a rim of a transmission housing.

11. The gantry axle according to claim 10, wherein spring carriers, which connect the gantry axle with a vehicle chassis, are connected with the gantry transmission.

12. A gantry axle comprising a driven differential gear unit which is connected, via an axle shaft (1) and via a respective gantry transmission, with each vehicle wheel, and each vehicle wheel being rotatable around an axis of rotation (12) of the vehicle wheel and resting up on ground (11), each gantry transmission having an input spur gear (2) driven by the axle shaft (1), the input spur gear (2) being operatively connected with a first intermediate spur gear (3) and the first intermediate spur gear (3) being non-rotatably connected with a second intermediate spur gear (4), both the first and the second intermediate spur gears (3, 4) rotating around an axis of rotation (9) of the intermediate spur gears (3, 4), and the second intermediate spur gear (4) being operatively connected with an output spur gear (5) which is connected with the vehicle wheel and rotates around the axis of rotation (12) of the vehicle wheel;

wherein a vertical spacing (15) of an axis of rotation (10) of the input spur gear (2) to the ground (11) is less than a vertical spacing (17) of the axis of rotation (9) of the first and the second intermediate spur gears (3, 4) to the ground (11) and is less than a vertical spacing (18) of the axis of rotation (12) of the output gear (5) to the ground (11);

the second intermediate spur gear (4) and the output spur gear (5) are adjacent to a mounting pad of a rim of a transmission housing; and the input, the first and the second intermediate and the output spur gears (2, 3, 4, 5) of the gantry transmission have helical cut teeth that are inclined with respect to axes of rotation (10, 9, 12) of the input, the first and the second intermediate and the output spur gears (2, 3, 4, 5); and a sloping angle of the helical cut teeth of the first and of the second intermediate spur gears (3, 4) are designed so that the axial forces of the first and of the second intermediate spur gears (3, 4) are substantially neutralized.

13. The gantry axle according to claim 12, wherein the axis of rotation (10) of the input spur gear (2) is spaced from the axis of rotation (9) of the intermediate spur gears (3, 4) and the axis of rotation (9) of the intermediate spur gears (3, 4) is spaced from the axis of rotation (12) of the output spur gear (5).

14. The gantry axle according to claim 12, wherein the axle shaft (1) is situated on an upper inner limit of an axle bridge.

15. The gantry axle according to claim 12, wherein the input spur gear (2) is mounted in the housing of the gantry transmission.

16. The gantry axle according to claim 12, wherein a ratio between the input spur gear (2) and the first intermediate spur gear is in a range of about 2.2.

17. The gantry axle according to claim 12, wherein a ratio between the second intermediate spur gear (4) and the output spur gear (5) is about 1.8.

18. The gantry axle according to claim 12, wherein a horizontal spacing between the axis of rotation (12) of the output spur gear (5) and the axis of rotation (10) of the input spur gear (2) is about 30 mm and a vertical spacing between the axis of rotation (12) of the output spur gear (5) and the axis of rotation (10) of the input spur gear (2) is about 189 mm.

19. The gantry axle according to claim 12, wherein an axle bridge is situated offset, in a travel direction of a vehicle equipped with the gantry axle, relative to the axis of rotation (12) of the vehicle wheel.

\* \* \* \* \*